(12) United States Patent
Miyazaki (10) Patent No.: US 8,209,123 B2
(45) Date of Patent: Jun. 26, 2012

(54) ROAD INFORMATION GENERATING APPARATUS, ROAD INFORMATION GENERATING METHOD, AND ROAD INFORMATION GENERATING PROGRAM

(75) Inventor: Hideto Miyazaki, Okazaki (JP)

(73) Assignee: Aisin AW Co., Ltd. (JP)

( * ) Notice: Subject to any disclaimer, the term of this patent is extended or adjusted under 35 U.S.C. 154(b) by 910 days.

(21) Appl. No.: 12/213,722

(22) Filed: Jun. 24, 2008

(65) Prior Publication Data

US 2009/0012709 A1    Jan. 8, 2009

(30) Foreign Application Priority Data

Jul. 5, 2007    (JP) .................................. 2007-177758

(51) Int. Cl.
*G08G 1/123*    (2006.01)

(52) U.S. Cl. ........ 701/532; 701/410; 701/412; 701/414; 701/416; 701/431; 701/445; 701/454; 701/527; 701/533; 701/541; 340/435; 340/903; 340/905; 340/907; 340/933

(58) Field of Classification Search .................. 701/200, 701/201, 208, 213, 223, 209, 300, 301, 117, 701/410, 412, 414, 416, 445, 454, 527, 532, 701/533, 541, 431; 705/13; 340/933, 436, 340/995.1, 903, 905, 907, 435
See application file for complete search history.

(56) References Cited

U.S. PATENT DOCUMENTS

| | | | | |
|---|---|---|---|---|
| 5,922,036 | A | 7/1999 | Yasui | 701/28 |
| 6,385,539 | B1 | 5/2002 | Wilson et al. | 701/213 |
| 6,526,352 | B1 | 2/2003 | Breed et al. | 701/203 |
| 6,577,334 | B1 | 6/2003 | Kawai et al. | 348/148 |
| 2001/0056326 | A1 | 12/2001 | Kimura | 701/208 |
| 2003/0103650 | A1 | 6/2003 | Otsuka et al. | 382/104 |
| 2005/0283699 | A1 | 12/2005 | Nomura et al. | 714/746 |
| 2006/0058964 | A1 * | 3/2006 | Lucas et al. | 701/301 |
| 2007/0021912 | A1 | 1/2007 | Morita et al. | |
| 2007/0038365 | A1 * | 2/2007 | An et al. | 701/200 |
| 2007/0050133 | A1 * | 3/2007 | Yoshikawa et al. | 701/209 |
| 2007/0107965 | A1 * | 5/2007 | Kakinami et al. | 180/167 |
| 2007/0198188 | A1 * | 8/2007 | Leineweber et al. | 701/300 |

FOREIGN PATENT DOCUMENTS

| | | |
|---|---|---|
| JP | 2000-230834 | 8/2000 |
| JP | 2004-251790 | 9/2004 |
| JP | 2005-190375 | 7/2005 |

* cited by examiner

*Primary Examiner* — Yogesh C Garg (74) *Attorney, Agent, or Firm* — Bacon & Thomas, PLLC (57) ABSTRACT

Host vehicle location information that indicates the location of a host vehicle is acquired, image information that includes the road along which the host vehicle is traveling is acquired, a host vehicle travel lane in which the host vehicle is traveling is detected based on the image information, lane information that indicates the position of the host vehicle travel lane is generated based on the host vehicle location information, and this lane information is registered on a storage medium.

4 Claims, 6 Drawing Sheets

ROAD INFORMATION GENERATING APPARATUS, ROAD INFORMATION GENERATING METHOD, AND ROAD INFORMATION GENERATING PROGRAM

INCORPORATION BY REFERENCE

The disclosure of Japanese Patent Application No. 2007-177758 filed on Jul. 5, 2007 including the specification, drawings and abstract is incorporated herein by reference in its entirety.

BACKGROUND OF THE INVENTION

1. Field of the Invention

The present invention relates to road information generating apparatus, methods, and programs that generate information related to roads.

2. Description of the Related Art

Conventionally, when updating the map information that is used by a navigation apparatus, new road information is generated based on the travel history of the vehicle, or it is determined whether or not the current location of the vehicle matches a position where the vehicle has traveled in the past, based on the travel history, and in the case in which the location does not match, it is assumed that the vehicle is traveling along a road not previously traveled, and supplementary information for the road or, more specifically, lane currently traveled is registered. See for example, Japanese Patent Publication JP-A-2004-251790).

SUMMARY OF THE INVENTION

In the conventional art, it is difficult to identify the lane of travel on a road that has a plurality of lanes and therefore difficult to generate lane information accurately.

Specifically, in Japanese Patent Publication JP-A-2004-251790, lane information is generated by comparing the previous travel paths of the vehicle with the current travel path of the vehicle. In such a system, it is difficult to accurately identify a plurality of lanes in a narrow road segment. For example, there can be cases in which a plurality of travel paths are recorded as being in the same lane. Therefore, travel paths may be identified as being in different lanes even though in the same lane, or travel paths may be identified as being the same lane even though in a different lane.

In consideration of the problems described above, it is an object of the present invention to more accurately generate lane information by identifying each of the lanes in a road with a plurality of lanes.

In order to attain the object described above, in the present invention the travel lane of a host vehicle is detected based on image information that includes a road along which the vehicle is traveling, lane information is generated that indicates the position of the host vehicle travel lane, and the generated lane information is registered on a storage medium. Because the host vehicle travel lane along which the host vehicle is traveling is detected based on an image that includes the road along which the vehicle is traveling, it is possible to specify the host vehicle travel lane from the actual appearance of the travel lane. Therefore, the host vehicle travel lane can be accurately determined, and the position thereof can be registered.

The apparatus of the present invention includes a host vehicle location information acquiring unit which acquires host vehicle position information that indicates a position of a host vehicle. This unit may be any of various devices capable of acquiring information indicating the location (position) of the host vehicle. For example, a unit can be used that includes a sensor or a camera for determining the position of the host vehicle, or a unit that acquires the host vehicle location information by determining the path of the host vehicle based on a signal from a GPS, from a map, from communication between vehicles, or from road-to-vehicle communication.

If the image information acquiring unit includes a camera which captures an image of the vicinity of the vehicle, which camera is mounted on the host vehicle or installed in the road surface or the like, it is possible to easily specify the relationship between the position of the road in the image and the position of the host vehicle, and to specify the host vehicle travel lane by using a simple device.

The apparatus of the present invention further includes a host vehicle travel lane detecting unit. The host vehicle travel lane detecting unit need only be able to detect the host vehicle travel lane based on the image information. The host vehicle travel lane detecting unit can detect the host vehicle travel lane based on various characteristic features in the image. Specifically, a lane in the road can be specified based on various features on the road and the lane can be detected by using an image containing these various features.

Thus, if an image containing lane features is captured, it is possible to specify the relationship between the position of the host vehicle travel lane and the position of the host vehicle, and to distinguish the host vehicle travel lane or other given lane from among a plurality of lanes. The features for specifying the host vehicle travel lane include all features that reflect the characteristics of the lane. Examples include the lane lines which represent the boundaries between the lanes, the center divider, the shoulder, road markings in the lane, and other structures.

The apparatus of the present invention further includes a lane information registering unit for generating lane information that indicates the position of the host vehicle travel lane, and for registering this generated information on a storage medium. Specifically, the position of the host vehicle travel lane can be specified as a reference position in the lane (for example, the transverse center or a side boundary). Thus, if the position of the host vehicle is specified, it is possible to specify the position of the host vehicle travel lane by using the relationship between the host vehicle and the host vehicle travel lane. Of course, it is also possible to specify the position of the host vehicle travel lane by using the reference position described above in the lane information. However, not only one position is registered as lane information for a lane, but preferably a discrete plurality of discrete positions are registered along the host vehicle travel lane.

When generating lane information that indicates the position of the host vehicle travel lane, the relationships of that lane with other lanes may be specified. Specifically, in traveling a road that has a plurality of lanes, convenience is enhanced by providing guidance and control based on the relationships between the host vehicle travel lane and other lanes. Thus, in a road that has a plurality of lanes, if the host vehicle travel lane and the other lanes are distinguished, and lane information that indicates the position of the host vehicle travel lane, along with the relationships between this host vehicle travel lane and the other lanes, is generated, then it is possible to generate lane information that will enable the driver to recognize the relationships between lanes along with the position of each of the lanes.

For example, with a navigation apparatus that uses the lane information that has been registered on a storage medium, it is possible to specify the lane in which the host vehicle is traveling by map matching and the like, to specify accurately the position in which the host vehicle is traveling in the lane, to provide guidance that is lane specific, i.e. that differs for each of the lanes, to provide accurate guidance for changing lanes, to provide guidance about congestion information that is lane specific, i.e. that differs for each of the lanes, and to provide vehicle control based on one of the curve contours that differ for each of the lanes.

In extracting images of the boundaries of the lanes from the image information, any characteristic of the boundaries of the lanes may be extracted. More specifically, it is possible to specify the boundaries based on various features relating thereto. Examples of such features include lane lines that show the boundaries of the lanes, the center divider, the shoulder, road markings in the lane, and other structures.

Furthermore, the information indicating the relationships between the host vehicle travel lane and the other lanes may specify the direction of the other lanes when viewed from the host vehicle travel lane. For example, it is possible to structure the apparatus to specify the presence or absence of another lane to the left or right of the host vehicle travel lane, to specify the relative position of the host vehicle travel lane in terms of number of the lane counted from the leftmost lane or to specify the relative position of the host vehicle in terms of left lane, the center lane, the right lane, or the like. While the generated lane information indicates the relationships between the host vehicle travel lane and the other lanes, in using the lane information, it is only required to be able to specify the relationships between the lanes, irrespective of whether a lane is the host vehicle travel lane.

In defining the position of the host vehicle travel lane, the tranverse center of the host vehicle travel lane is normally set as the position of the host vehicle travel lane. The host vehicle normally travels at the transverse center or substantially the center of the host vehicle travel lane, and thus, the position of the host vehicle may be specified as the position of the host vehicle travel lane.

Utilizing the image information, it can easily be determined whether or not the host vehicle is traveling in the transverse center or substantially the center of the host vehicle travel lane. Specifically, if the relationship between the host vehicle and the host vehicle travel lane is determined from the image information it can be easily determined whether or not the host vehicle is traveling along the transverse center or substantially the center of the host vehicle travel lane.

In addition, even in the case in which the host vehicle is not traveling along substantially the center of the host vehicle travel lane, it is possible to specify the transverse center position of the host vehicle travel lane based on the image information. Specifically, if the relationship between the host vehicle and the host vehicle travel lane can be determined from the image information it is possible to specify the transverse position of the host vehicle within the host vehicle travel lane. Thus, if a deviation between the transverse position in which the host vehicle is traveling and the transverse center of the host vehicle travel lane is identified, it is possible to specify the transverse center of the host vehicle travel lane by adjusting for that deviation.

Furthermore, lane information for the host vehicle travel lane is generated and registered in the case where lane information for the host vehicle travel lane has not previously been registered on the storage medium. With such a system, it is possible to save resources because there is no excess registering of the same information or redundant execution of routines for generating the same lane information. Note that the registering of lane information for a certain lane may be treated as complete either after lane information has been once generated for each lane or after generated for each lane a plurality of times. When lane information for a certain lane is generated a plurality of times, the lane information is in the form of statistical values (mean averages or the like), and is registered in such form, thereby generating and registering more accurate lane information.

Furthermore, the routine by which the host vehicle travel lane is determined from the image information and the lane information that indicates the position thereof is generated may be embodied in the form of a computer readable medium with a program encoded thereon or in the form of a method. In addition, the road information generating apparatus that has been described above may be either a single (stand alone) road information generating apparatus or a combination of elements shared in whole or in part with other apparatus mounted in the vehicle. For example, a navigation apparatus, method and/or program may include a road information generating apparatus, method and/or program as has been described above. In addition, appropriate modifications are possible in which a portion of the system is realized by software and a portion is realized by hardware. Furthermore, the invention is applicable to a recording medium with encoded programs for control of the road information generating apparatus. This recording medium may be a magnetic recording medium, a magneto-optical recording medium, or any type of recording medium that may be developed in the future.

DESCRIPTION OF THE PREFERRED EMBODIMENTS

Preferred embodiments of the present invention will now be explained in the following order:
(1) the structure of the navigation apparatus,
(2) the road information generating process,
(3) the guidance process, and
(4) alternative embodiments.

(1) The structure of the Navigation Apparatus

Figure 1:
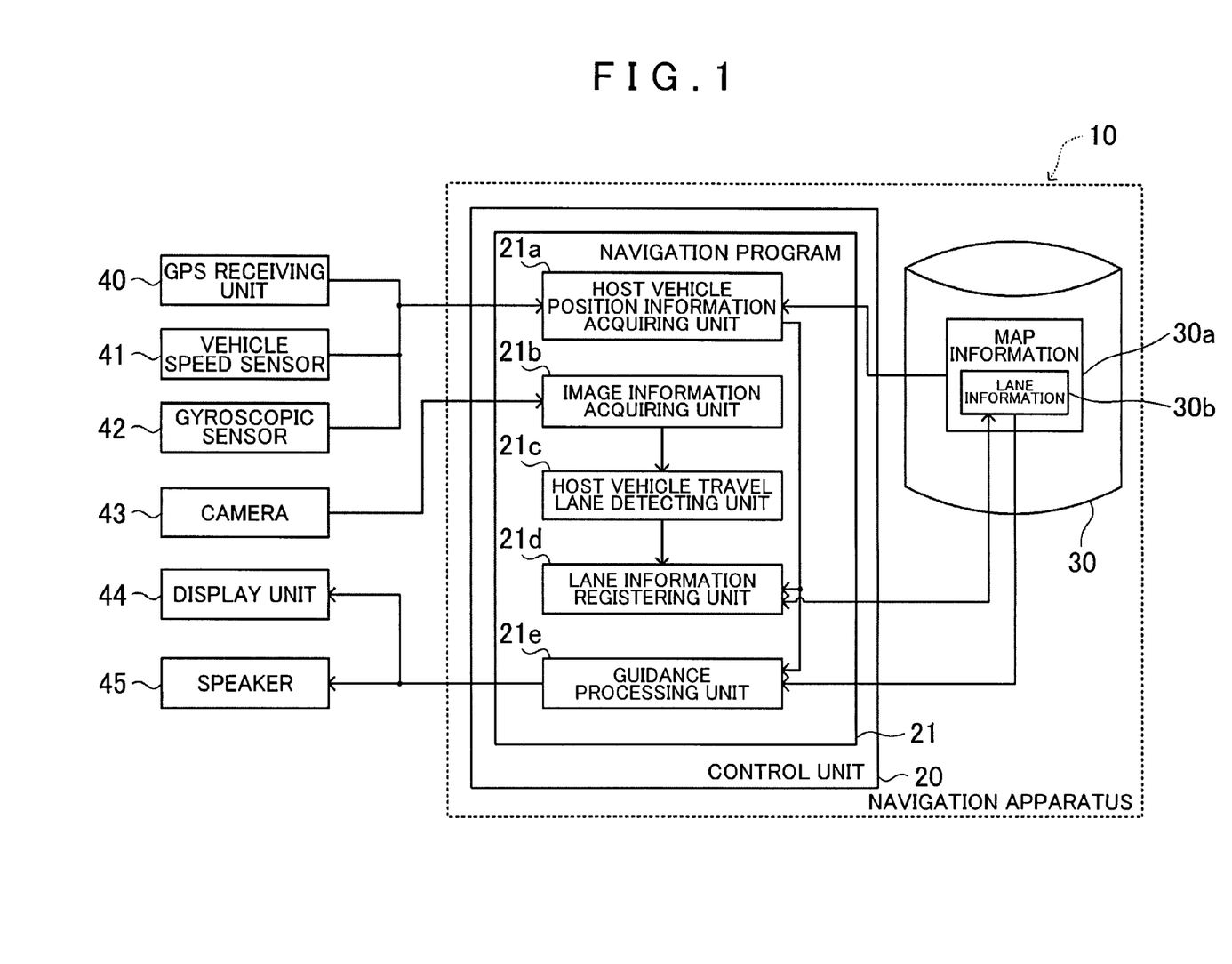
FIG. 1 is a block diagram of a navigation apparatus that includes a road information generating apparatus in accordance with the present invention.

FIG. 1 is a block diagram showing a navigation apparatus 10, adapted to serve as the road information generating apparatus according to the present invention. The navigation apparatus 10 includes a control unit 20 that is provided with a CPU, RAM, ROM and the like, and a storage medium 30. The control unit 20 executes programs, including a navigation program 21, that are stored on the storage medium 30 and the ROM. In the present embodiment, the navigation program 21 includes, as one of its functions, a function that registers lane information for the positions of each of the plural lanes of a road and the relationships between each of the lanes and a function of providing guidance based on this lane information.

The host vehicle (a vehicle on which the navigation apparatus 10 is mounted) is a GPS receiving unit 40, a vehicle speed sensor 41, a gyroscopic sensor 42, a camera 43, a display unit 44, and a speaker 45 in order to enable execution of the functions of the navigation program 21. The transfer of signals between each of these units and the control unit 20 is enabled by an interface (not illustrated).

The GPS receiving unit 40 receives radio signals from GPS satellites and outputs information for calculating the current location of the host vehicle via an interface (not illustrated). The control unit 20 receives this signal, and thereby acquires the current location of the host vehicle. The vehicle speed sensor 41 outputs signals that correspond to the rotational speed of the wheels of the host vehicle, which signals are received by the control unit 20 via an interface (not illustrated), and used to determine the speed of the vehicle. The gyroscopic sensor 42 outputs a signal that corresponds to the direction of the host vehicle, which signal is also received by the control unit 20 via an interface (not illustrated), and used to determine the travel direction of the host vehicle. The vehicle speed sensor 41 and the gyroscopic sensor 42 are used in order to correct the current location of the host vehicle that has been determined based on the output signal of the GPS receiving unit 40. In addition, the current location of the host vehicle is appropriately corrected based on its travel path.

Figure 2:
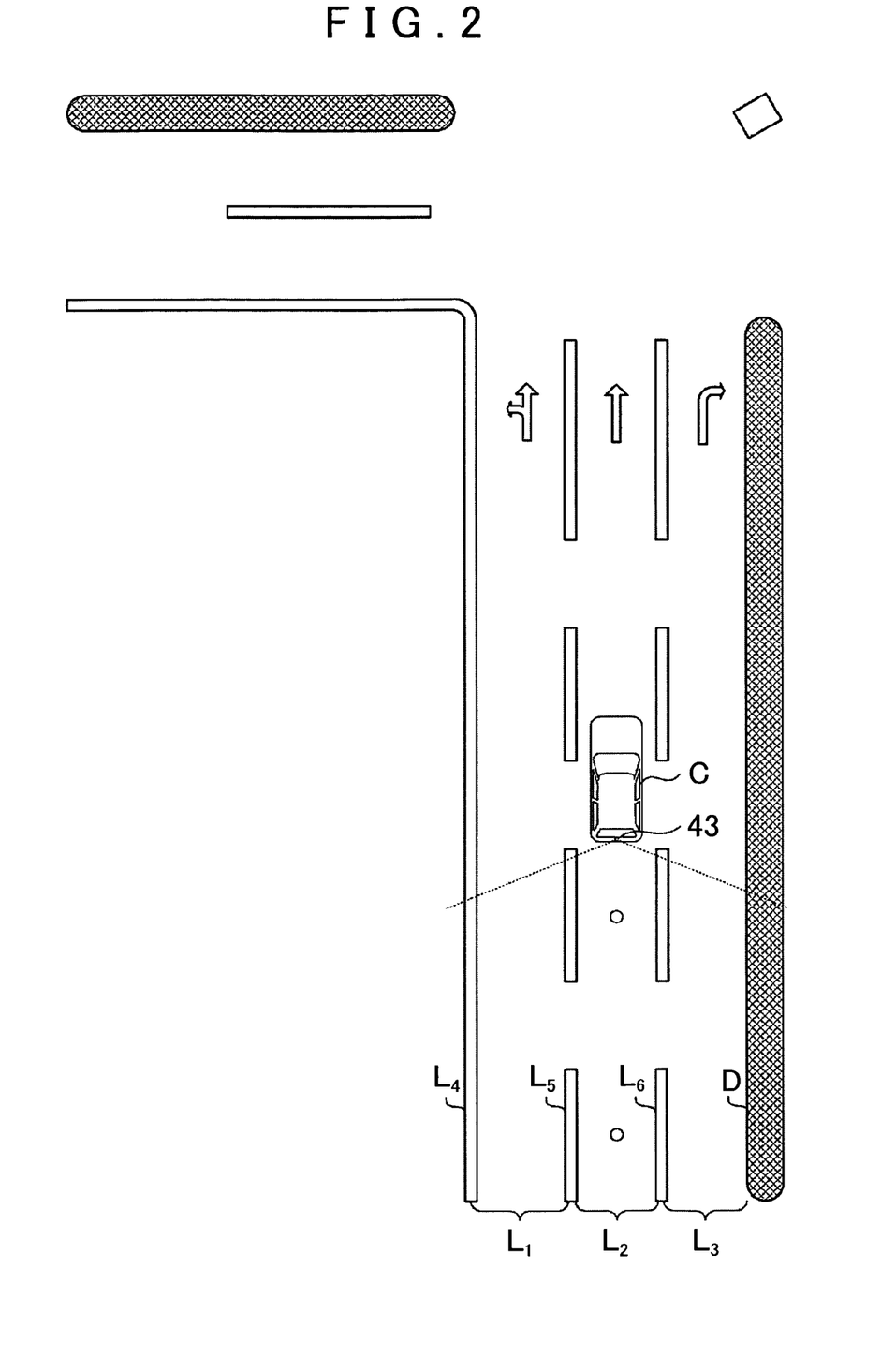
FIG. 2 is a diagram of a host vehicle traveling along a road, viewed from above.

The camera 43 photographs an image of the vicinity of the host vehicle and outputs image information, that includes the road along which the host vehicle is traveling, to the control unit 20 via an interface (not illustrated). FIG. 2 shows the host vehicle C traveling along a road, viewed from above, with the camera 43 installed on the back portion of the host vehicle C as a rear-view camera. The field of view of this camera 43 is the road surface to the rear of the host vehicle C, which field of view is shown by the broken lines. Provided that the camera 43 can photograph an image including the road on which the host vehicle is traveling, the camera 43 may be a front camera for photographing the road surface in front of the host vehicle, or a camera that photographs the road surface to the side of the host vehicle.

In the present embodiment, the navigation apparatus 10 is made to function as the road information generating apparatus according to the present invention by the navigation program 21 for registration of lane information. Thus, the navigation program 21 is provided with a host vehicle location information acquiring unit 21a, an image information acquiring unit 201b, a host vehicle travel lane detecting unit 21c, and a lane information registering unit 21d. In addition, a guidance unit 21e is provided to output guidance utilizing lane information.

In addition, map information 30a for use in executing the navigation program 21 to provide guidance is stored on the storage medium 30. The map information 30a includes, for example, node data for the nodes that are set along the road and contour interpolation point data which serves to specify the shape of a road between nodes, link data for the links connecting nodes and contour interpolation points, and data for landmarks. The map information 30a is used in the determination of the current location of the host vehicle, in guidance to a destination point, and in correcting the host vehicle location on the travel path of the host vehicle by map matching.

In the present embodiment, the node data and the contour interpolation point data include data that give the location on the road are generated for each of the lanes and registered (stored). Furthermore, in the present embodiment, the nodes and the contour interpolation points are set so that the relationships between the lanes can be understood. For example, each node and each contour interpolation point can be correlated with a lane number identifying the lane as the nth lane (where n is a natural number) when counting from the left side toward the right side of the road. Note that the node data and the contour interpolation point data in the present embodiment are included in the map information 30a, but because they are stored in correlation with a lane, they are also referred to as lane information 30b.

The host vehicle location information acquiring unit 21a is a module that acquires the host vehicle location information, indicating the location of the host vehicle. Unit 212 receives the output signals of the GPS receiving unit 40, the vehicle speed sensor 41, and the gyroscopic sensor 42, and using those signals determines the longitude and latitude of the current location of the host vehicle, and the result is used as the host vehicle location information. The image information acquiring unit 21b is a module that acquires the image information that is output by the camera 43, and the acquired image information is received by the host vehicle travel lane detecting unit 21c.

The host vehicle travel lane detecting unit 21c is a module that detects the host vehicle travel lane along which the host vehicle is traveling based on the image information. In the present embodiment, it extracts an image of the boundaries of the lanes. Specifically, on a road, features that correspond to the boundaries of the lanes (for example, road markings and structures) are present, and thus it is possible to identify (specify) the lane if the image information includes such features and a characteristic that corresponds to the boundaries of the lanes is extracted. Thus, the host vehicle travel lane detecting unit 21c detects the host vehicle travel lane by determining the relationships between the host vehicle C and each of the lanes based on the position of the camera 43 and each of the lanes in the image.

Figure 3:
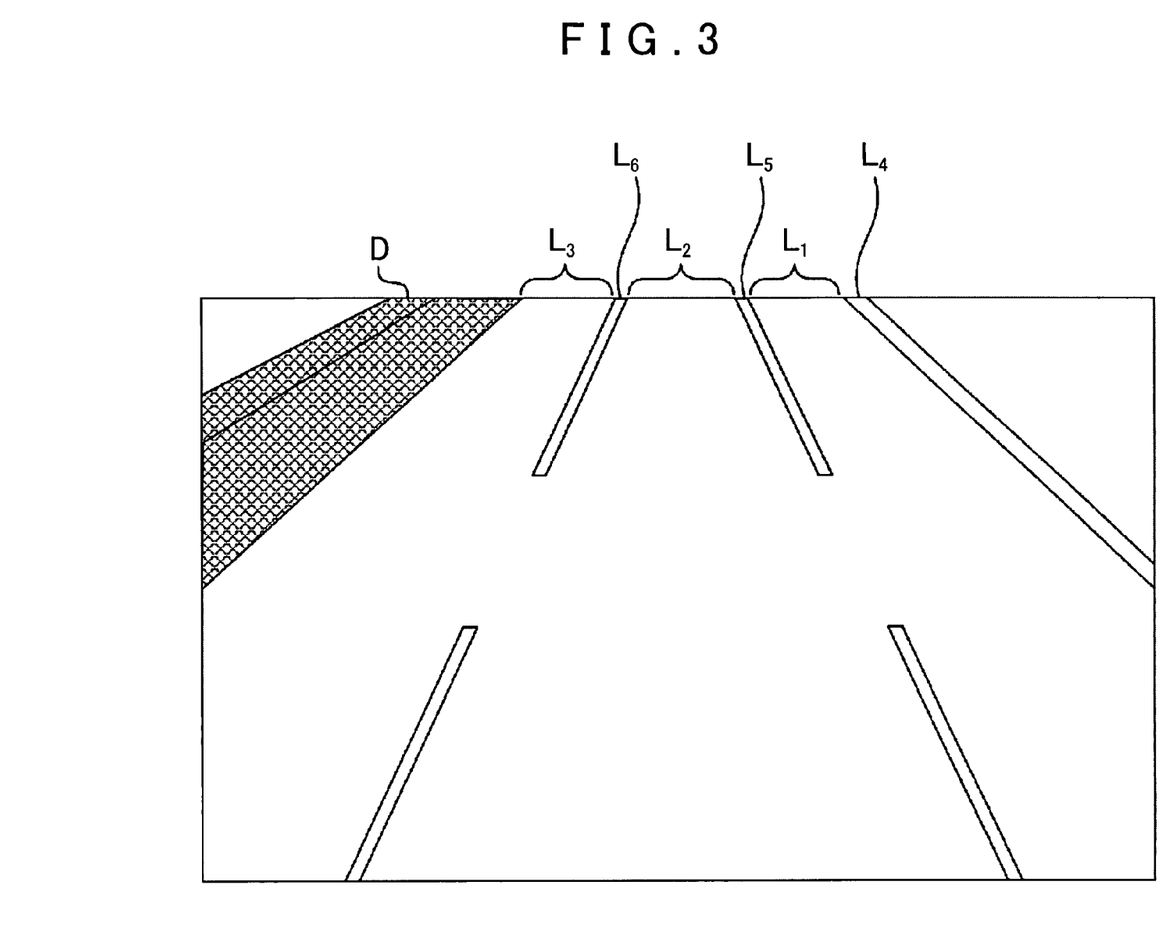
FIG. 3 is an example of an image that is captured by a camera.

For example, the boundaries of lanes $L_1$, $L_2$, and $L_3$ in the road that is shown in FIG. 2 are white lines $L_4$, $L_5$, and $L_6$, which are road markings, and a center divider D, which is a structure. When this road is photographed by the camera 43 of the host vehicle C, an image such as that shown in FIG. 3 is obtained. White lines $L_4$, $L_5$, and $L_6$, and the center divider D extend along the road in the image that is shown in FIG. 3. Thus, an image that shows the white lines $L_4$, $L_5$, and $L_6$, and the center divider D is extracted, and if the edges thereof are specified, it is possible to treat those edges as the boundaries of the lanes. The extraction of the image that shows the white lines $L_4$, $L_5$, and $L_6$ and the center divider D, and the specification of the edges can executed using well-known methods (for example, pattern matching and edge extraction, Hough transform and the like).

The position where the camera 43 is mounted in the host vehicle C has been determined in advance, and thus it is possible to associate a feature in the image captured by the camera 43 with the actual position of the feature in the vicinity of the host vehicle C. For example, it is possible to specify that a feature that is present at the center of the image is a feature that is centered relative to the host vehicle, and a feature that is present on the right side of the image is a feature that is present on the left rear side of the host vehicle. In the example that is shown in FIG. 3, it can be seen that the center divider D is present on the right rear side of the host vehicle and that the white line $L_4$, which is continuous, is present on the left rear side of the host vehicle C. Thus, based on the image that is shown in FIG. 3, it is possible to determine that there are three lanes. Therefore, when the lanes are designated $L_1$, $L_2$, and $L_3$ in order from the left, it is possible to determine (detect) that the host vehicle travel lane is $L_2$.

The lane information registering unit 21d generates the node data or the contour interpolation point data that shows the position of the host vehicle travel lane that has been determined as explained above, based on the host vehicle location information that has been described above, and registers this generated data on the storage medium 30 as the lane information 30b. In the present embodiment, the lane information 30b is generated by setting the center position of the lane in the transverse direction to the position of a node or a contour interpolation point (which will be explained below in detail). In addition, in the present embodiment, it is possible to determine the relationships between the lanes from the image information, and thus the lane information 30b which is generated enables these relationships to be understood.

The guidance unit 21e executes a guidance program utilizing the lane information 30b. Specifically, the host vehicle travel lane and the lanes in the vicinity thereof are identified by acquiring the lane information 30b, and the content of the guidance is specified based on the results of this identification. In addition, data for the content of the guidance is output to the display unit 44 and the speaker 45. Thus, the content of the guidance is displayed in the display unit 44 and output from the speaker 45. As a result, the driver who is driving the host vehicle C can drive utilizing guidance that discriminates between the different lanes.

(2) Road Information Generating Routine

Figure 4:
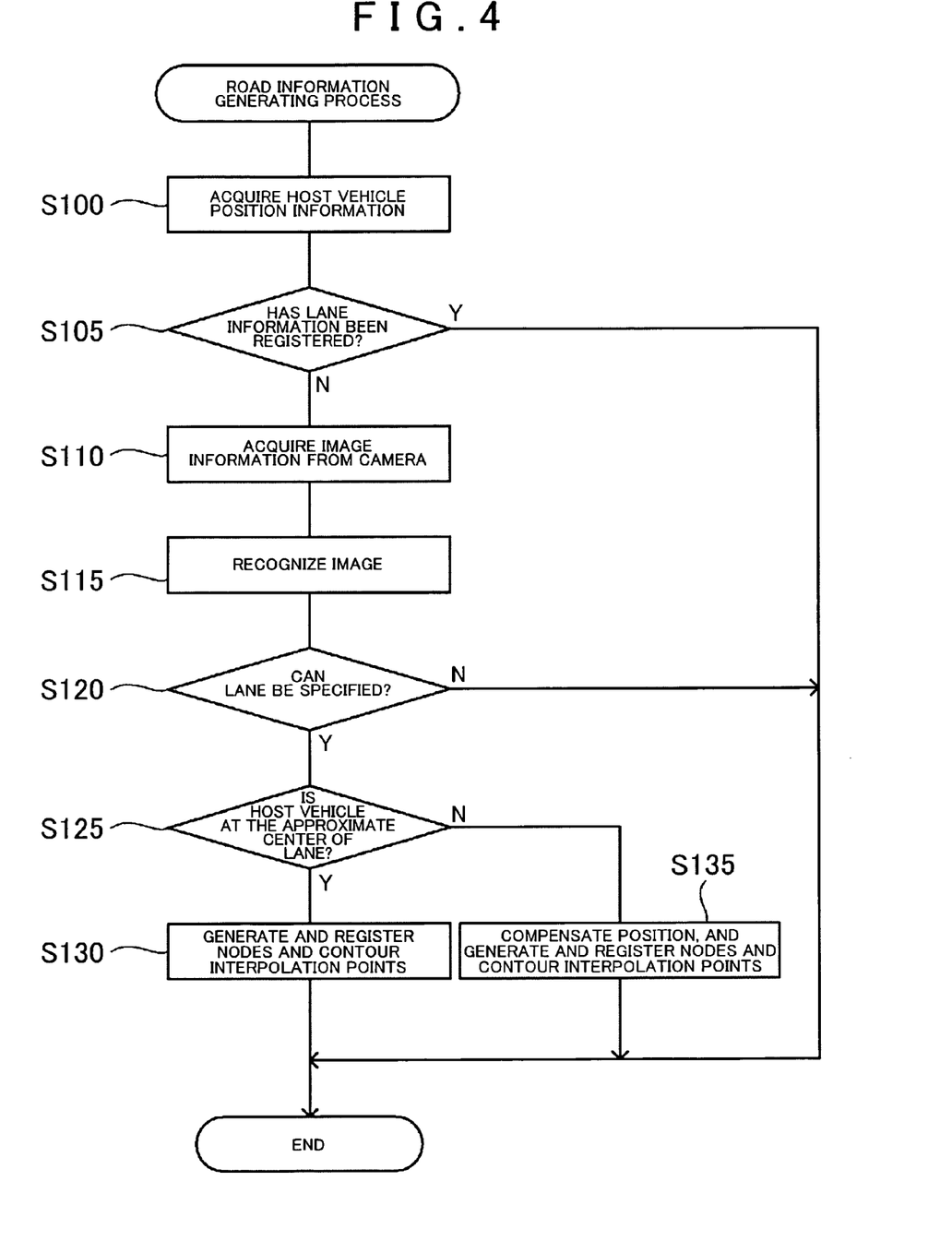
FIG. 4 is a flowchart of a road information generating process of the present invention.

Next, a road information generating routine that is executed by the navigation apparatus 10 will be explained. When the navigation program 21 is executed by the navigation apparatus 10 while the host vehicle is traveling, the road information generating routine shown in FIG. 4 is repeatedly executed at a constant interval (for example, 100 ms).

First the host vehicle information acquiring unit 21a acquires the host vehicle location information as the output signals of the GPS receiving unit 40, the vehicle speed sensor 41, and the gyroscopic sensor 42 (step S100). Next, the lane information registering unit 21d determines whether or not lane information for the lane in which the host vehicle is currently located has already been registered (step S105). In the present embodiment, because the map matching process described above is carried out in the navigation program 21, in the case in which the position of the host vehicle which is indicated by the host vehicle position information can not be matched in the map matching process, it is determined that the lane information has not yet been registered.

Specifically, map matching determines that the host vehicle is traveling along a given road when the travel path of the host vehicle conforms to the arrangement of the nodes and the contour interpolation points for that road. Thus, in the present embodiment, the case in which there is no matching is evaluated as meaning that the nodes and contour interpolation points have not yet been registered. In step S105, when it is determined that the lane information for the lane that corresponds to the location (position) of the host vehicle has been registered, the process skips to step S110 because it is not necessary to generate lane information for that lane.

Conversely, in step S105, when it is determined that the lane information of the host vehicle lane has not been registered, in step S110 and subsequent steps, a process is executed to generate the lane information which is then registered (stored) on the storage medium 30. In this process, first, the image information acquiring unit 21b acquires image information from the camera 43 (step S110), and the host vehicle travel lane detecting unit 21c executes image recognition (step S115). Specifically, based on the image information, the host vehicle travel lane detecting unit 21c executes a routine that detects the image of a feature that corresponds to the boundaries of the lanes, and thereby detects the host vehicle travel lane and the other lanes.

Next, the host vehicle travel lane detecting unit 21c determines whether or not the host vehicle travel lane and the other lanes can be distinguished (step S120). Specifically, in the image recognition, there are cases in which the host vehicle travel lane and the other lanes cannot be distinguished due to the influence of the weather, presence of other vehicles or the like. In such a case, it is not possible to accurately determine the relationships between the host vehicle travel lane and the other lanes and thus, when it has not been determined in step S120 that the lane can be distinguished, the process skips to step S125 and the lane information is not generated.

Conversely, when it has been determined in step S120 that the host vehicle travel lane and the other lanes can be distinguished, the lane information registering unit 21d executes a routine in which the center of the host vehicle travel lane in the transverse direction is set as the center of the host vehicle travel lane in the image information. In order to do this, first, it is determined whether or not the vehicle is traveling along substantially the transverse center of the host vehicle travel lane (step S125). Specifically, because the camera 43 is secured to the host vehicle, in the present embodiment it is possible to specify in advance a position corresponding to a specified position in the image that has been acquired by the camera 43 when viewed from the host vehicle. Therefore, if the host vehicle travel lane is detected based on the image information, it is possible to determine the relationship between the host vehicle travel lane and the host vehicle, and to determine whether or not the host vehicle is traveling along substantially the center of the host vehicle travel lane.

For example, when the camera 43 is secured to the center of the vehicle in the transverse direction such that the optical axis of the camera 43 faces toward the rear of the vehicle, the center in the left to right direction of the image that has been taken by the camera 43 matches the center of the host vehicle in the transverse direction. The image that is shown in FIG. 3 shows this example, and because the position of the center of the image in the left to right direction matches the center of the host vehicle in the transverse direction, it is possible to determine whether or not the host vehicle is traveling at the transverse center of the host vehicle travel lane, depending on whether or not the position of the center in the image in the left to right direction and the center point between the two boundaries of the image substantially match.

In step S125, when it has been determined that the host vehicle is traveling along the transverse center of the host vehicle travel lane, the lane information registering unit 21d acquires the host vehicle location information, generates lane information by setting the location of the host vehicle at the position of a node or a contour interpolation point, and registers the lane information on the storage medium 30 (step S130). Specifically, in the present embodiment, because the substantially center position of the lane should be registered as the location of a node or a contour interpolation point, in the case in which the host vehicle is traveling in substantially the center of the host vehicle travel lane, the location of the host vehicle is set to the position of the host vehicle travel lane. In this manner, it is possible to easily distinguish the host vehicle travel lane.

In step S125, when it has not been determined that the host vehicle is traveling along the center of the host vehicle travel lane, the lane information registering unit 21d acquires the host vehicle location information, specifies the transverse center position of the lane by compensating for the position that is given by the host vehicle position information, generates lane information by setting the center position to the position of a node or a contour interpolation point, and registers the lane information on the storage medium 30 (step S135). Specifically, in order to compensate for the deviations of the host vehicle from the center of its travel lane, first, the center position of the host vehicle travel lane between the boundaries is detected based on the image that has been captured by the camera 43.

In addition, if the center position between the boundaries and the center position of the image in the left to right direction (that is, the center position of the vehicle in the transverse direction) are acquired, it is possible to specify the deviation between the center of the lane and the position of the host vehicle. Therefore, if the deviation of the position of the host vehicle is increased or decreased (that is, if the transverse position is corrected), it is possible to specify the transverse center of the lane based on the location of the host vehicle. Thus, when the transverse center of the lane is determined, lane information is generated by using this center position as the position of a node or a contour interpolation point, and the generated lane information is registered on the storage medium 30. The white circles that are shown in FIG. 2 indicate the position of a node or a contour interpolation point in the lane information that is generated in step S130 or step S135, and this node or the contour interpolation point is registered at a discrete position that has been determined in advance.

Note that in the above process, a position substantially in the center of the lane may be determined in advance as a range in which the position of the host vehicle can be treated as in the transverse center of the lane. In addition, in steps S130 and S135, as has been explained above, lane information is generated such that the relationships between the host vehicle travel lane and the other lanes can be understood. Specifically, the lane information registering unit 21*d* detects the boundaries of the host vehicle travel lane and the other lanes based on the image information, and determines the arrangement of the lanes based on the boundaries. A node or a contour interpolation point is associated with information indicating that the host vehicle travel lane is the nth (where n is a natural number) lane counted from the left side to the right side of the road.

As has been described above, in the present embodiment, a road is photographed by the camera 43 to obtain an image showing the actual appearance of the lanes, the host vehicle travel lane and the other lanes are distinguished, and the positions of the lanes are registered as positions of nodes or contour interpolation points. Therefore, it is possible to register the position of lanes accurately with clear distinction between the lanes.

(3) Guidance Process

Next, the guidance provided by the navigation apparatus 10 that has been described above will be explained. When the navigation program 21 is executed by the navigation apparatus 10 while the host vehicle is traveling, the guidance unit 21*e* repeatedly executes the guidance routine at constant intervals (for example, 100 ms).

Figure 5:
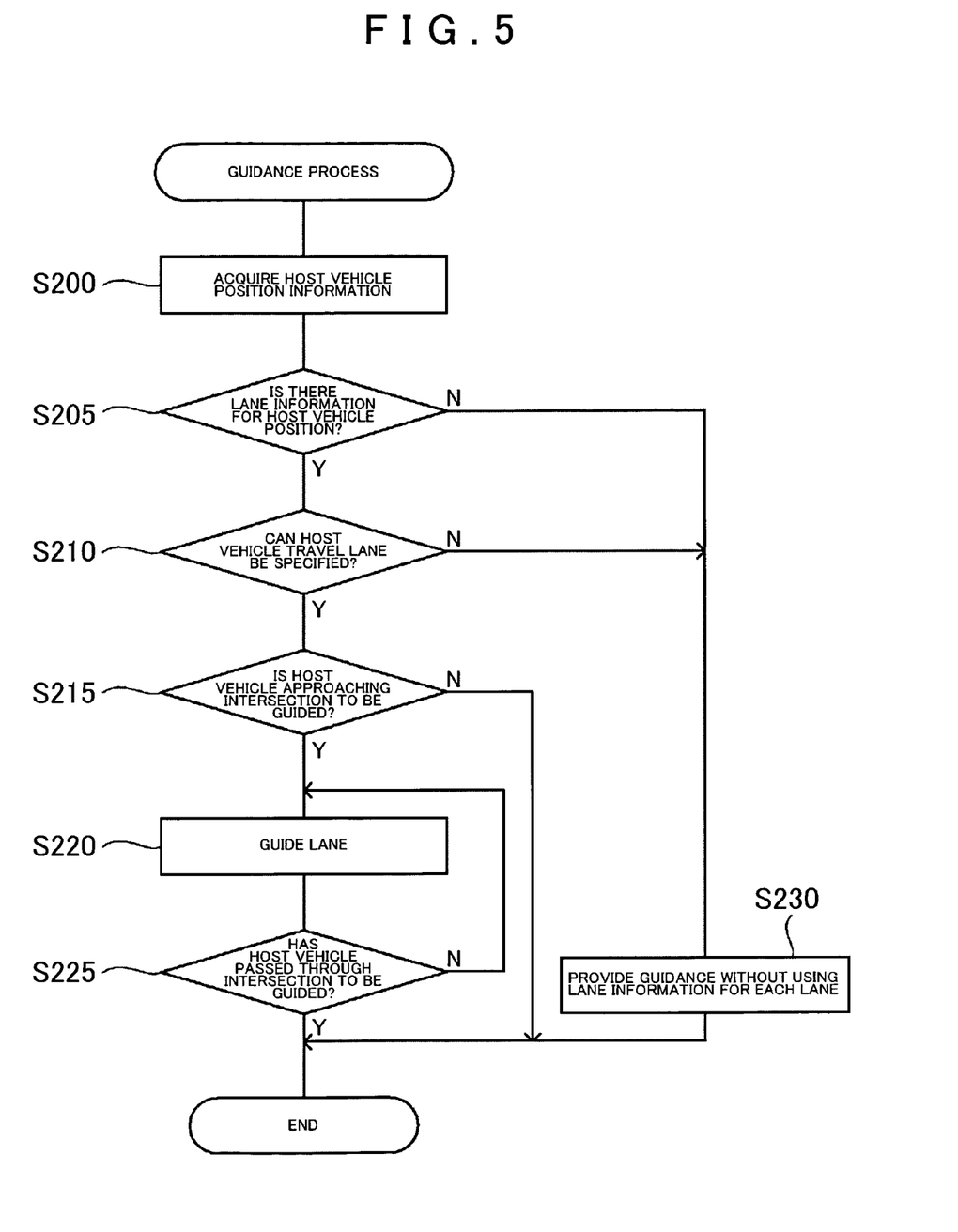
FIG. 5 is a flowchart of a lane guidance routine of the present invention.

FIG. 5 shows the process when guidance is provided for an intersection approached by the host vehicle traveling along a road that has been set in advance. In this process, first, the guidance process unit 21*e* acquires the host vehicle location (position) information (step S200). Specifically, the host vehicle location information that has been acquired by the host vehicle location information acquiring unit 201*a* is received, and the location of the host vehicle is specified.

Next, the guidance process unit 21*e* determines whether or not there is a lane that corresponds to the location of the host vehicle (step S205). Specifically, the lane information 30*b* is referenced, and it is determined whether or not nodes or contour interpolation points are present in the vicinity of the location of the host vehicle which substantially match the position of the host vehicle. In step S205, if it is determined that there is no lane corresponding to the position of the host vehicle, guidance is provided without using the lane information that indicates the nodes or the contour interpolation points for each lane (step S230).

Specifically, even when the routine that is shown in FIG. 4 is not executed, map information 30*a* is registered wherein the lanes are not distinguished in the information for the nodes and the contour interpolation points of each of the roads. Thus, guidance is carried out based on nodes and contour interpolation points for which the lanes are not distinguished.

On the other hand, in step S205, when it has been determined that there is a lane corresponding to the transverse position of the host vehicle, it is determined whether or not it is possible to specify the host vehicle travel lane based on the host vehicle location information (step S210). Here as well, in the matching process that has been described above, it is determined whether or not the travel path of the host vehicle conforms to the arrangement of the nodes and contour interpolation points that have been registered in the lane information 30*b*, and the case in which it does conform is evaluated as a case in which it is possible to specify the host vehicle travel lane. In step S210, if it is determined that it is not possible to specify the host vehicle travel lane, guidance is provided without using the lane information that indicates the nodes and contour interpolation points of each of the lanes (step S230).

When it has been determined in step S210 that it is possible to specify the host vehicle travel lane, it is further determined whether or not the host vehicle is approaching an intersection for which guidance is to be provided (guidance intersection) (step S215). Specifically, the guidance process unit 21*e* refers to the host vehicle location information and the map information 30*a*, acquires the location of the intersection based on the node of the guidance intersection, and based on the location of the guidance intersection and the location of the host vehicle, determines whether or not the distance between the intersection and the host vehicle is equal to or less than a predetermined distance (for example, several hundred meters). When it is determined in step S215 that the host vehicle is not approaching a guidance intersection, it is not necessary to provide guidance for an intersection at this point in time, and thus, step S220 and step S225 are skipped.

When it has been determined in step S215 that the host vehicle is approaching a guidance intersection, the guidance process unit 21*e* provides lane guidance (step S220). Specifically, because a planned route for the host vehicle at the guidance intersection has been predetermined, at the guidance intersection it is possible to specify whether the vehicle is to execute a right or left turn or travel forward. Thus, in order to guide the host vehicle to change to a lane that is advantageous for executing either a left or right turn or for traveling forward, the guidance process unit 21*e* outputs lane information for guidance to the display unit 44 and the speaker 45. As a result, it is possible for the host vehicle to more easily change to a lane most advantageous for executing either a right or left turn or for traveling forward at the intersection. Note that when it is determined in step S225 that the host vehicle has passed through the guidance intersection, the guidance process unit 21*e* ends the foregoing guidance routine.

Figure 6:
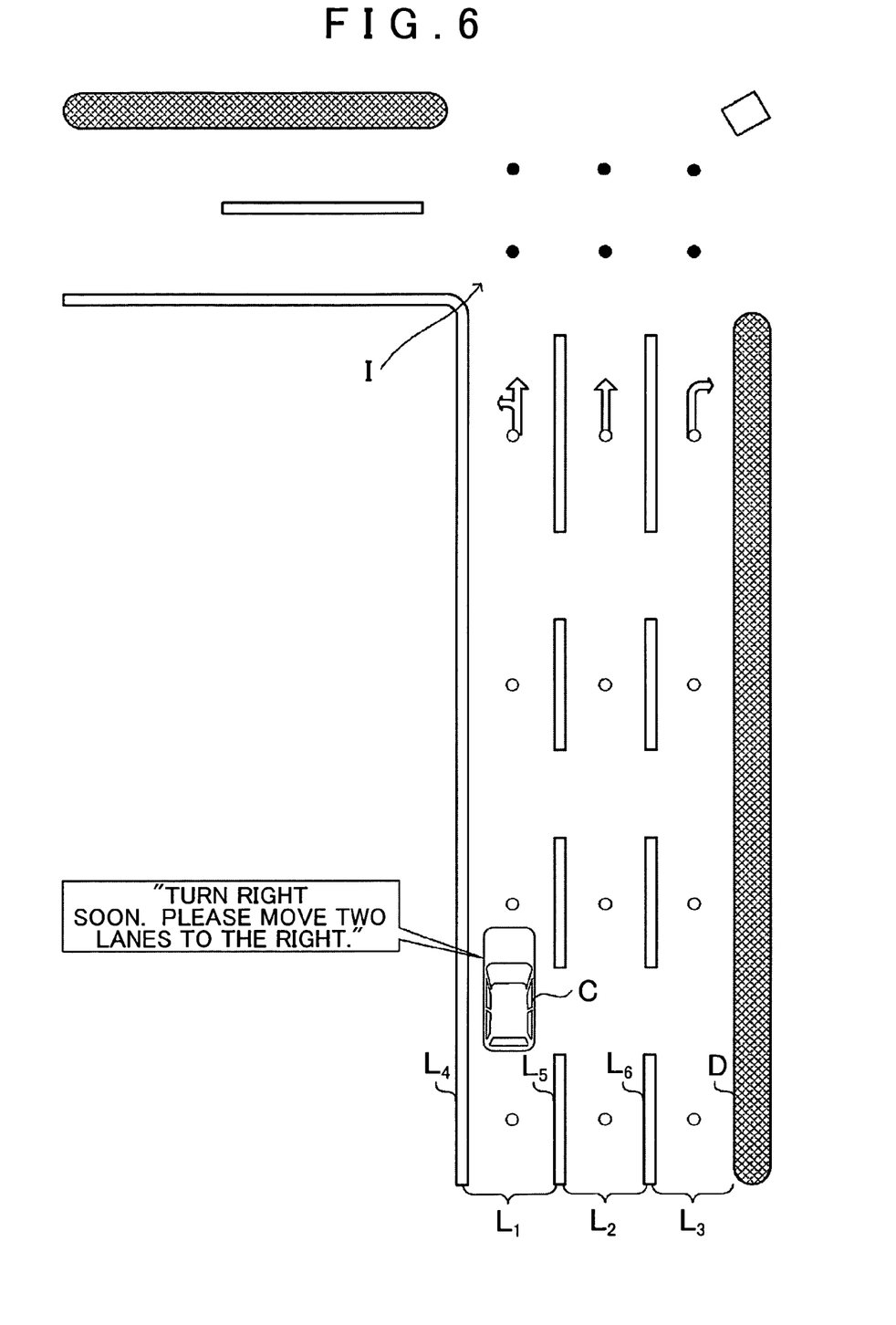
FIG. 6 is another diagram of a host vehicle traveling along a road, viewed from above.

FIG. 6 shows a road that is similar to the road shown in FIG. 2, and an example in which the host vehicle should make a right turn at an intersection I on this road will now be explained. In FIG. 6, the contour interpolation points are indicated by white circles and the nodes are indicated by black circles, and in this example it is assumed that lane information indicating the nodes and the contour interpolation points for to the lanes $L_1$, $L_2$, and $L_3$ of the road along which the host vehicle C is traveling have been registered on the storage medium 30.

In this example, when the guidance process unit 21e provides route guidance, because the nodes and the contour interpolation points conform to the path of the host vehicle, in the routine illustrated in FIG. 5, after steps S200 to S205, it is determined that a lane corresponds to the position of the host vehicle, and therefore, in step S210, it is determined that it is possible to specify the host vehicle travel lane. In addition, in step S215, it is determined that the host vehicle C is approaching the intersection I.

Therefore, in step S220, lane guidance is provided based on the lane information for the host vehicle travel lane. In the example that is shown in FIG. 6, the host vehicle C is traveling in the leftmost lane $L_1$, and it is necessary for the host vehicle to change to the rightmost lane $L_3$ in order to make a right turn at the intersection I. Thus, in step S220, in order to guide the host vehicle C to move to lane $L_3$ before entering the intersection I, an audio control message, for example, "Turn right soon. Please move two lanes to the right." is output through the speaker 45. As a result, the driver will realize that it is necessary to change lanes twice in order to travel according to the travel plan, and it is possible to carry out the lane changes in preparation for entering the intersection I.

(4) Alternative Embodiments

The above described embodiment is but one example for implementing the present invention, and provided that it is possible to detect the host vehicle travel lane based on image information and that it is possible to generate lane information that indicates the position of the host lane, various alternative embodiments can be used. For example, instead of host vehicle location information derived from all of the GPS receiving unit 40, the vehicle speed sensor 41, and the gyroscopic sensor 42, the host vehicle position information may be derived from only a portion of these units, or the host vehicle location information may be acquired from a image that has been captured by a camera. In addition, it is possible to acquire the host vehicle location information by inter-vehicle communication, road-to-vehicle communication, or the like.

Furthermore, instead of determining the host vehicle travel lane from an image captured by a camera mounted on the host vehicle, the host vehicle travel lane may be determined from an image of the vicinity of the host vehicle captured by a camera mounted in the road surface. Furthermore, in distinguishing the host vehicle travel lane or any one lane from among a plurality of lanes based on image information, reference may be made to the road shoulder, road markings in the lane and/or various structures, in addition to the lines that indicate the boundaries of the lanes and center divider.

Furthermore, when registering the position of the lane as lane information, registering the center position of the lane in the transverse direction is preferable because the results can be directly used in map matching. However, in specifying a lane, it is also possible to register a transverse position other than the center of the lane as the position of the lane. For example, the position of the host vehicle travel lane may also be specified by a reference position corresponding to a side boundary of the lane.

Furthermore, the mode of use of the lane information in which the position of each lane has been registered is not limited to the guidance that has been described above. For example, if the lane along which the host vehicle is traveling is determined by map matching or the like, it is possible to specify accurately the lane along which the host vehicle is traveling. If the position of the vehicle travel lane is specified accurately, it is possible to provide more accurate guidance based on the location (position) of the host vehicle. In addition, it is possible to provide guidance that differs for each lane and/or traffic congestion information that differs for each lane.

Furthermore, by setting contour interpolation points for each lane, it is possible to provide vehicle control according to one of plural curve contours that differ for each lane. For example, in a system in which the direction of the optical axis of the headlights of the host vehicle is changed depending on the curve contour, it is possible to change the direction of the optical axis by an angle that differs for each lane depending on the radius of curvature of that lane.

Furthermore, the information that indicates the relationships between the host vehicle travel lane and the other lanes, which is registered in the lane information, is only required to be structured to be able to specify the direction of another lane when viewed from the host vehicle travel lane based on at least this information. Therefore, for example, when the position of the host vehicle travel lane is registered, the presence or absence of another lane to the left or right of the host vehicle travel lane, the relative position of the host vehicle travel lane in terms of the number of the lane when counted from the leftmost lane and/or the relative position as left lane, center lane, right lane, etc. may be specified. Of course, the lane information is generated so as to indicate the relationships between the host vehicle travel lane and the other lanes, but in using the lane information it is only necessary to be able to distinguish between the lanes, irrespective of whether or not a lane is identified as the host vehicle travel lane.

Furthermore, determination of whether or not lane information for a lane that corresponds to the location of the host vehicle has been previously registered is not limited to success or failure of a matching routine. Specifically, here, in the case in which the lane information for the host vehicle travel lane is not yet registered on the storage medium, provided that lane information for the host vehicle travel lane can be generated and registered, the system may instead determine whether or not lane information for the vicinity of the host vehicle has been registered. In such a modification, it is possible to save resources because there is no excess data created by registration of the same information and redundant execution of routines that generate the same lane information.

Note that the registeration of lane information for a certain lane may be treated as complete at the point in time at which lane information has been once generated for each lane, or a point in time when lane information for each lane has been generated a plurality of times. Specifically, when lane information for a certain lane has been generated a plurality of times, lane information may be registered as statistical values (mean values or the like) thereby making it possible to generate and register more accurate lane information.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A road information generating apparatus, comprising:
a host vehicle position information acquiring unit that acquires host vehicle position information that indicates a position of a host vehicle;
an image information acquiring unit that acquires image information that includes a road along which the host vehicle is traveling, the image information acquiring unit comprising a camera mounted on the host vehicle;
a host vehicle travel lane detecting unit that detects a host vehicle travel lane along which the host vehicle is traveling and other vehicle travel lanes by extracting an image of a boundary of the lanes from the image information and determines whether or not the host vehicle lane and the other lanes can be distinguished; and
a lane information registering unit that, responsive to a determination that the host vehicle travel lane and the other lanes can be distinguished, determines whether or not the host vehicle is traveling along substantially the transverse center of the host vehicle travel lane, and, when it has been determined that the host vehicle is traveling along the transverse center of the host vehicle travel lane, acquires the host vehicle position information, generates lane information by setting the position of the host vehicle at a node or a contour interpolation point, and registers the generated lane information on a storage medium, and, when it is determined that the host vehicle is not traveling along the center of the host vehicle lane, acquires the host vehicle location information, specifies the transverse center position of the lane by compensating for the position that is given by the host vehicle position information, generates lane information by setting the center position to the position of a node or a contour interpolation point, and registers the generated lane information on the storage medium, wherein the lane information indicates the position of the host vehicle travel lane relative to the other vehicle travel lanes in terms of a number of the host vehicle lane, based on the host vehicle position information.

2. The road information generating apparatus according to claim 1, wherein the number of the host vehicle travel lane is counted from the leftmost lane.

3. A road information generating method, comprising the steps of:
acquiring, utilizing a host vehicle position information acquiring unit, host vehicle position information that indicates a position of a host vehicle;
acquiring, from a camera mounted on the host vehicle, image information that includes a road along which the host vehicle is traveling;
detecting, utilizing a host vehicle travel lane detecting unit, a host vehicle travel lane along which the host vehicle is traveling and other vehicle travel lanes by extracting an image of a boundary of the lanes from the image information;
determining, utilizing the host vehicle travel lane detecting unit, whether or not the host vehicle travel lane and the other lanes can be distinguished;
responsive to a determination that the host travel lane and the other lanes can be distinguished, determining, utilizing a lane information registering unit, whether or not the host vehicle is traveling along substantially the transverse center of the host vehicle travel lane, and, when it has been determined that the host vehicle is traveling along the transverse center of the host vehicle travel lane, acquiring the host vehicle position information, generating lane information by setting the position of the host vehicle at a node or a contour interpolation point, and registering the generated lane information on a storage medium, and, when it is determined that the host vehicle is not traveling along the center of the host vehicle lane, acquiring the host vehicle location information, specifying the transverse center position of the lane by compensating for the position that is given by the host vehicle position information, generating lane information by setting the center position to the position of a node or a contour interpolation point, and registering the generated lane information on the storage medium, wherein the generated lane information indicates the position of the host vehicle travel lane, relative to the other vehicle travel lanes in terms of a number of the host vehicle lane, based on the host vehicle position information;
generating, in a navigation unit, guidance information utilizing the generated lane information; and
outputting the guidance information to a driver of the host vehicle by display of the guidance information on a display unit.

4. A non-transitory computer-readable medium having encoded thereon a road information generating program which, when executed by a processor, that makes a computer function as:
a host vehicle position information acquiring unit that acquires host vehicle information that indicates a position of a host vehicle;
an image information acquiring unit that acquires, from a camera mounted on the host vehicle, image information that includes a road along which the host vehicle is traveling;
a host vehicle travel lane detecting unit that detects the a host vehicle travel lane along which the host vehicle is traveling and other vehicle travel lanes by extracting an image of a boundary of the lanes from the image information and determines whether or not the host vehicle lane and the other lanes can be distinguished; and
a lane information registering unit that, responsive to a determination that the host vehicle travel lane and the other lanes can be distinguished, determines whether or not the host vehicle is traveling along substantially the transverse center of the host vehicle travel lane, and, when it has been determined that the host vehicle is traveling along the transverse center of the host vehicle travel lane, acquires the host vehicle position information, generates lane information by setting the position of the host vehicle at a node or a contour interpolation point, and registers the generated lane information on a storage medium, and, when it is determined that the host vehicle is not traveling along the center of the host vehicle lane, acquires the host vehicle location information, specifies the transverse center position of the lane by compensating for the position that is given by the host vehicle position information, generates lane information by setting the center position to the position of a node or a contour interpolation point, and registers the generated lane information on the storage medium, wherein the lane information indicates the position of the host vehicle travel lane relative to the other vehicle travel lanes in terms of a number of the host vehicle lane, based on the host vehicle position information.

* * * * *

UNITED STATES PATENT AND TRADEMARK OFFICE
CERTIFICATE OF CORRECTION

PATENT NO. : 8,209,123 B2
APPLICATION NO. : 12/213722
DATED : June 26, 2012
INVENTOR(S) : Hideto Miyazaki It is certified that error appears in the above-identified patent and that said Letters Patent is hereby corrected as shown below:

Column 14, line 16 (claim 4, line 3) delete "that"; and

Column 14, line 35 (claim 4, line 12) delete "the".

Signed and Sealed this
Twenty-first Day of August, 2012

David J. Kappos
*Director of the United States Patent and Trademark Office*